United States Patent
Li et al.

(10) Patent No.: US 11,748,294 B2
(45) Date of Patent: Sep. 5, 2023

(54) RETIMER APPLICATION SYSTEM, RETIMER, AND DATA TRANSMISSION METHOD

(71) Applicant: HUAWEI TECHNOLOGIES CO., LTD., Shenzhen (CN)

(72) Inventors: Yongyao Li, Shenzhen (CN); Fei Luo, Chengdu (CN); Jiankang Li, Chengdu (CN); Jie Wan, Chengdu (CN); Gongxian Jia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/315,715

(22) Filed: May 10, 2021

(65) Prior Publication Data

US 2021/0263879 A1    Aug. 26, 2021

Related U.S. Application Data

(63) Continuation of application No. PCT/CN2020/070118, filed on Jan. 2, 2020.

(30) Foreign Application Priority Data

Jan. 3, 2019 (CN) .................. 201910004366.9

(51) Int. Cl.
*G06F 13/42* (2006.01)
*G06F 13/40* (2006.01)
*H04L 25/03* (2006.01)

(52) U.S. Cl.
CPC ........ *G06F 13/423* (2013.01); *G06F 13/4068* (2013.01); *H04L 25/03885* (2013.01)

(58) Field of Classification Search
CPC .............. G06F 13/423; G06F 13/4068; H04L 25/03885
See application file for complete search history.

(56) References Cited

U.S. PATENT DOCUMENTS

| | | |
|---|---|---|
| 10,126,999 B1 | 11/2018 | Redman et al. |
| 2005/0270988 A1 | 12/2005 | DeHaemer |

(Continued)

FOREIGN PATENT DOCUMENTS

| | | |
|---|---|---|
| CN | 102707678 A | 10/2012 |
| CN | 104050138 A | 9/2014 |

(Continued)

*Primary Examiner* — Phong H Dang
(74) *Attorney, Agent, or Firm* — Maier & Maier, PLLC

(57) ABSTRACT

A retimer application system is provided, which includes a primary chip, a retimer, and a secondary chip. After first link training is completed, the retimer is configured to store, in a first storage area, an equalization parameter corresponding to each rate during the first link training, and data stored in the first storage area is not lost when the retimer performs a reset operation. The retimer is further configured to: receive a reset indication, and perform the reset operation according to the reset indication. The primary chip and the secondary chip are configured to perform second link training triggered by the reset indication. During the second link training, the retimer is further configured to: invoke the equalization parameter, and transparently transmit a training sequence in the second link training to the primary chip or the secondary chip based on the equalization parameter.

20 Claims, 7 Drawing Sheets

(56) References Cited

U.S. PATENT DOCUMENTS

| | | | | |
|---|---|---|---|---|
| 2010/0020179 A1* | 1/2010 | Horan | ................... | H04L 1/243 |
| | | | | 348/192 |
| 2010/0183004 A1* | 7/2010 | Kobayashi | ............ | G06F 13/385 |
| | | | | 370/389 |
| 2013/0051483 A1* | 2/2013 | Wyatt | ............... | H04L 25/03885 |
| | | | | 375/259 |
| 2014/0241411 A1* | 8/2014 | Ghiasi | ................. | H04L 25/4904 |
| | | | | 375/231 |
| 2016/0283433 A1* | 9/2016 | Nair | ................... | G06F 13/4022 |
| 2017/0371831 A1* | 12/2017 | Das Sharma | ....... | G06F 13/4068 |
| 2018/0227149 A1* | 8/2018 | Johnson | .................. | H04L 49/90 |
| 2018/0293196 A1 | 10/2018 | Srivastava et al. | | |
| 2018/0331864 A1* | 11/2018 | Das Sharma | ........... | H04L 25/03 |
| 2019/0034376 A1* | 1/2019 | Das Sharma | ............ | G11C 7/00 |
| 2019/0258600 A1* | 8/2019 | Das Sharma | ....... | G06F 13/4291 |
| 2020/0174962 A1* | 6/2020 | Tresidder | ............ | G06F 13/4291 |

FOREIGN PATENT DOCUMENTS

| | | | |
|---|---|---|---|
| CN | 107430569 A | 12/2017 | |
| CN | 108418582 A | 8/2018 | |
| CN | 108920173 A | 11/2018 | |
| CN | 109857690 A | 6/2019 | |
| EP | 2778938 B1 | 4/2017 | |

* cited by examiner

RETIMER APPLICATION SYSTEM, RETIMER, AND DATA TRANSMISSION METHOD

CROSS-REFERENCE TO RELATED APPLICATIONS

This application is a continuation application of international patent application number PCT/CN2020/070118 filed on Jan. 2, 2020, which claims priority to Chinese patent application number 201910004366.9, filed on Jan. 3, 2019. The disclosures of the aforementioned applications are hereby incorporated by reference in their entireties.

TECHNICAL FIELD

The embodiments relate to the communications field, and more specifically, to a retimer application system, a retimer, and a data transmission method.

BACKGROUND

A peripheral component interconnect express (PCIe) bus is a high-speed bus used by a processor in a computer system to connect to a peripheral device. As a PCIe signal velocity increases and a PCIe bus is more widely applied, a retimer) with a time sequence recovery function is increasingly widely used between two PCIe devices. Because the retimer has a delay, an extra delay (40 ns to 68 ns) is added each time a level of retimer is added, resulting in system performance loss. This impact is unacceptable in some application scenarios, for example, a PCIe memory application scenario. Therefore, how to reduce a retimer delay while ensuring a retimer drive capability (about 28 dB) is a problem that needs to be resolved.

SUMMARY

The embodiments provide a retimer application system, a retimer, and a data transmission method to reduce a transmission delay.

According to a first aspect, a retimer application system is provided, including a primary chip, a retimer, and a secondary chip. A downstream port of the primary chip is connected to an upstream port of the retimer, and a downstream port of the retimer is connected to an upstream port of the secondary chip. The connection herein includes a direct connection and an indirect connection.

After first link training is completed, the retimer is configured to store, in a first storage area, an equalization parameter corresponding to each rate during the first link training, where data stored in the first storage area is not lost when the retimer performs a reset operation;

the retimer is further configured to: receive a reset indication, and perform the reset operation according to the reset indication;

the primary chip and the secondary chip are configured to perform second link training triggered by the reset indication; and during the second link training, the retimer is further configured to: invoke the equalization parameter, and transparently transmit a training sequence in the second link training to the primary chip or the secondary chip based on the equalization parameter, to complete the second link training between the primary chip and the secondary chip.

For example, when detecting that the secondary chip is connected to a link, the primary chip performs the first link training. The primary chip, the secondary chip, and the retimer all participate during the first link training. After the first link training is completed, the retimer may store, in the first storage area, the equalization parameter corresponding to each rate during the first link training. After the first link training is completed, the retimer receives the reset indication, and the retimer performs the reset operation when or after receiving the reset indication. The reset operation may be resetting all upstream ports and downstream ports of the retimer, or resetting the upstream port connected to the primary chip and the downstream port connected to the secondary chip. The reset operation of the retimer triggers the second link training between the primary chip and the secondary chip, where the retimer does not participate in the second link training. During the second link training between the primary chip and the secondary chip, the retimer invokes the equalization parameter, and transparently transmits the training sequence in the second link training between the primary chip and the secondary chip based on the equalization parameter.

In the retimer application system provided in the embodiments, the primary chip, the secondary chip, and the retimer perform the first link training, to implement link load balancing and ensure a link compensation capability. After the first link training is completed, the primary chip and the secondary chip perform the second link training triggered by the reset operation of the retimer. During the second link training, the retimer transparently transmits the training sequence between the primary chip and the secondary chip based on the equalization parameter obtained during the first link training. Therefore, based on implementation of normal second link training, efficiency of the second link training can be further improved. After the second link training is completed, the retimer may transparently transmit service data between the primary chip and the secondary chip, so that a transmission delay can be reduced.

With reference to the first aspect, in a first possible implementation, the first storage area is a storage area in a nonvolatile memory or firmware of the retimer. The nonvolatile memory may be, for example, an electrically erasable programmable read-only memory (EEPROM).

For example, the retimer may include the first storage area, or the first storage area may be located outside the retimer.

When the first storage area is located inside the retimer, the equalization parameter is stored in the retimer, so that a speed of invoking the equalization parameter can be improved.

With reference to the first aspect or the first possible implementation of the first aspect, in a second possible implementation, after the first link training is completed, the retimer is further configured to bypass a plurality of data processing circuits included in the retimer, so that the retimer enters a low-delay mode; and correspondingly, after the second link training is completed, the retimer is further configured to transparently transmit the service data between the primary chip and the secondary chip in the low-delay mode.

For example, a manner of implementing the transparent transmission (for example, transparent transmission of the training sequence) is: after the first link training is completed, the retimer bypasses the plurality of data processing circuits included in the retimer. A working mode is the low-delay mode after the retimer bypasses the plurality of data processing circuits. In other words, after bypassing the plurality of data processing circuits, the retimer enters the low-delay mode. In the low-delay mode, the plurality of data processing circuits are in a bypass state, and the retimer only transparently transmits a received data stream. After or when bypassing the plurality of data processing circuits, in other words, after or when the retimer enters the low-delay mode, the retimer receives the reset indication, where the reset indication triggers the reset operation of the retimer. In this case, because the retimer works in the low-delay mode, the retimer only forwards the training sequence during the second link training triggered by the reset operation. In addition, after the second link training is completed, the retimer transmits the service data between the primary chip and the secondary chip in the low-delay mode, that is, the retimer transparently transmits the service data between the primary chip and the secondary chip.

The retimer performs the first link training, to implement link load balancing and ensure a link compensation capability. After the first link training is completed, the retimer performs the reset operation and invokes the equalization parameter obtained through the first link training. Because the data processing circuit is in the bypass state, the retimer only forwards the received training sequence without processing the training sequence, so that the second link training can be completed quickly. After the second link training, the retimer transmits the service data between the primary chip and the secondary chip in the low-delay mode, so that a transmission delay can be reduced.

With reference to the first aspect, the first possible implementation of the first aspect, or the second possible implementation of the first aspect, in a third possible implementation, the retimer further includes a link state machine (LTSSM), where the data processing circuit is configured to convert received serial data into a training sequence for processing by the link state machine, and convert the training sequence processed by the link state machine into serial data.

With reference to the third possible implementation of the first aspect, in a fourth possible implementation, during the first link training, the retimer is further configured to store the equalization parameter in a register; and after the first link training is completed, the retimer is further configured to store, in the first storage area, the equalization parameter that is stored in the register.

With reference to the fourth possible implementation of the first aspect, in a fifth possible implementation, during the second link training, the retimer is further configured to store the equalization parameter that is stored in the first storage area in the register.

With reference to any one of the first aspect or the first to the fifth possible implementations of the first aspect, in a sixth possible implementation, the application system further includes a basic input/output system (BIOS), and after the first link training is completed, the BIOS is configured to send the reset indication to the retimer.

The BIOS sends the reset indication, and there is no need to specially design the primary chip and the secondary chip or modify a standard negotiation sequence, so that the retimer has quite good commonality.

With reference to any one of the first aspect or the first to the fifth possible implementations of the first aspect, in a seventh possible implementation, after the first link training is completed, the primary chip is configured to send the reset indication to the retimer.

With reference to any one of the first aspect or the first to the seventh possible implementations of the first aspect, in an eighth possible implementation, the retimer includes a sending equalization circuit and a receiving equalization circuit, and after the retimer enters the low-delay mode, an output of the receiving equalization circuit is used as an input of the sending equalization circuit.

Further, the receiving equalization circuit may include a continuous time linear equalization (CTLE)/decision feedback equalization (DFE) circuit. The sending equalization circuit may include a feed forward equalization (FFE) circuit.

The equalization parameter obtained after the first link training and stored in the retimer described above may include a receiving equalization parameter of the receiving equalization circuit and a sending equalization parameter of the sending equalization circuit.

With reference to any one of the first aspect or the first to the eighth possible implementations of the first aspect, in a ninth possible implementation, the retimer supports a plurality of protocols, and can select a working protocol used by the primary chip and the secondary chip to work, and the plurality of protocols include at least one of the following:

a peripheral component interconnect express (PCIe) protocol, a cache coherent interconnect for accelerators (CCIX) protocol, or a universal serial bus (USB) protocol.

The retimer in this application may support a plurality of high-speed buses, and is widely applied. In addition, during system design, a plurality of types of retimers do not need to be considered for use, so that hardware design complexity and subsequent verification workload can be reduced.

Optionally, a protocol used by the retimer may be selected by pulling up or down a specified pin of the retimer. Alternatively, through a management interface (for example, Smbus) defined in a standard, system software configures, after power-on, a protocol used by the retimer to work. Alternatively, a protocol used by the retimer is configured by using a specific negotiation code stream (for example, denoted as a second negotiation code stream).

With reference to any one of the first aspect or the first to the ninth possible implementations of the first aspect, in a tenth possible implementation, the data processing circuit may include a serial-to-parallel conversion circuit, an elastic buffer (elastic buffer), a descrambling/decoding circuit, a scrambling/encoding circuit, and a parallel-to-serial conversion circuit.

For specific functions and implementations of these modules, refer to the prior art. Details are not described herein again.

In the retimer in the embodiments, in a data transmission process, data only passes through the receiving equalization circuit and the sending equalization circuit, and there is no need to first perform serial-to-parallel conversion, buffering, and descrambling/decoding, and then perform scrambling/encoding and parallel-to-serial conversion on the received data according to a protocol stipulation. Instead, a circuit obtained after equalization implements bitwise processing and forwarding to avoid a delay caused by operations such as serial-to-parallel conversion, buffering, descrambling/decoding, scrambling/encoding, and parallel-to-serial conversion, thereby implementing a low-delay function.

In addition, based on simulation estimation, compared with a retimer in an existing standard, when only the sending equalization circuit and the receiving equalization circuit are reserved, and the serial-to-parallel conversion circuit, the elastic buffer, the descrambling/decoding circuit, the scrambling/encoding circuit, and the parallel-to-serial conversion circuit are bypassed, the retimer provided in the embodiments can reduce a delay to about 5 ns, thereby improving system performance.

According to a second aspect, a data transmission method is provided, and the method includes:

after first link training is completed, storing, by a retimer in a first storage area, an equalization parameter corresponding to each rate during the first link training, where data stored in the first storage area is not lost when the retimer performs a reset operation;

receiving, by the retimer, a reset indication, and performing the reset operation according to the reset indication; and in a process in which the primary chip and the secondary chip perform second link training triggered by the reset indication, invoking, by the retimer, the equalization parameter, and transparently transmitting a training sequence in the second link training to the primary chip or the secondary chip based on the equalization parameter, to complete the second link training between the primary chip and the secondary chip.

With reference to the second aspect, in a first possible implementation, the first storage area is a storage area in a nonvolatile memory or firmware of the retimer.

In a possible implementation, the method further includes:

after the first link training is completed, bypassing, by the retimer, a plurality of data processing circuits included in the retimer, so that the retimer enters a low-delay mode; and correspondingly, after the second link training is completed, transparently transmitting, by the retimer, service data between the primary chip and the secondary chip in the low-delay mode.

With reference to the second aspect or the first possible implementation of the second aspect, in a second possible implementation, the retimer further includes a link state machine, where the data processing circuit is configured to convert received serial data into a training sequence for processing by the link state machine, and convert the training sequence processed by the link state machine into serial data.

With reference to the second aspect, the first possible implementation of the second aspect, or the second possible implementation of the second aspect, in a third possible implementation, the method further includes:

storing, by the retimer, the equalization parameter in a register during the first link training; and the step of storing the equalization parameter in the first storage area includes:

after the first link training is completed, storing, by the retimer, the equalization parameter that is stored in the register in the first storage area.

With reference to the third possible implementation of the second aspect, in a fourth possible implementation, the step of invoking, by the retimer, the equalization parameter includes:

storing, by the retimer, the equalization parameter that is stored in the first storage area in the register.

With reference to any one of the second aspect or the first to the fourth possible implementations of the second aspect, in a fifth possible implementation, the method further includes:

after the first link training is completed, sending, by a BIOS, the reset indication to the retimer.

With reference to any one of the second aspect or the first to the fifth possible implementations of the second aspect, in a sixth possible implementation, the method further includes:

after the first link training is completed, sending, by the primary chip, the reset indication to the retimer.

With reference to any one of the second aspect or the first to the sixth possible implementations of the second aspect, in a seventh possible implementation, the retimer includes a sending equalization circuit and a receiving equalization circuit, and after the retimer enters the low-delay mode, an output of the receiving equalization circuit is used as an input of the sending equalization circuit.

With reference to any one of the second aspect or the first to the seventh possible implementations of the second aspect, in an eighth possible implementation, the retimer supports a plurality of protocols, and can select a working protocol used by the primary chip and the secondary chip to work, and the plurality of protocols include at least one of the following: a PCIe protocol, a CCIX protocol, or a USB protocol.

With reference to any one of the second aspect or the first to the eighth possible implementations of the second aspect, in a ninth possible implementation, the first storage area is a nonvolatile memory.

The method provided in the second aspect may be applied to the retimer application system provided in the first aspect. For example, the primary chip, the secondary chip, and the retimer in the second aspect may correspond to the primary chip, the secondary chip, and the retimer in the first aspect. Therefore, for details of the method in the second aspect, refer to the foregoing description of the application system in the first aspect. Details are not described herein again.

According to a third aspect, a retimer is provided, including a control circuit, where after first link training is completed, the control circuit is configured to store, in a first storage area, an equalization parameter corresponding to each rate during the first link training, where data stored in the first storage area is not lost after the retimer performs a reset operation; and after the reset operation is performed, the control circuit is further configured to: invoke the equalization parameter, and transparently transmit a training sequence in second link training to a primary chip or a secondary chip based on the equalization parameter, to complete the second link training between the primary chip and the secondary chip, where the second link training is triggered by the reset operation.

The retimer provided in this embodiment performs the first link training, to implement link load balancing and ensure a link compensation capability. After the first link training is completed, the primary chip and the secondary chip perform second link training triggered by the reset operation of the retimer. During the second link training, the retimer transparently transmits the training sequence between the primary chip and the secondary chip based on the equalization parameter obtained based on the first link training Therefore, based on implementation of normal second link training, efficiency of the second link training can be further improved. After the second link training is completed, the retimer may transparently transmit service data between the primary chip and the secondary chip, so that a transmission delay can be reduced.

Optionally, the retimer includes the first storage area.

Optionally, the first storage area is located outside the retimer.

With reference to the third aspect, in a first possible implementation of the third aspect, the retimer further includes a plurality of data processing circuits, where after the first link training is completed, the control circuit is configured to bypass the plurality of data processing circuits, so that the retimer enters a low-delay mode; and correspondingly, after the second link training is completed, the retimer transparently transmits the service data between the primary chip and the secondary chip in the low-delay mode.

With reference to the third aspect or the first possible implementation of the third aspect, in a second possible implementation, the first storage area is a storage area in a nonvolatile memory or firmware of the retimer.

With reference to the first possible implementation of the third aspect, in a third possible implementation, the retimer further includes a link state machine, where the data processing circuit is configured to convert received serial data into a training sequence for processing by the link state machine, and convert the training sequence processed by the link state machine into serial data.

With reference to any one of the third aspect or the first to the third possible implementations of the third aspect, in a fourth possible implementation, during the first link training, the control circuit is further configured to store the equalization parameter in a register; and after the first link training is completed, the control circuit is further configured to store, in the first storage area, the equalization parameter that is stored in the register.

With reference to the fourth possible implementation of the third aspect, in a fifth possible implementation, during the second link training, the control circuit is further configured to store the equalization parameter that is stored in the first storage area in the register.

With reference to any one of the third aspect or the first to the fifth possible implementations of the third aspect, in a sixth possible implementation, the retimer includes a sending equalization circuit and a receiving equalization circuit, and after the retimer enters the low-delay mode, an output of the receiving equalization circuit is used as an input of the sending equalization circuit.

With reference to any one of the third aspect or the first to the sixth possible implementations of the third aspect, in a seventh possible implementation, the retimer supports a plurality of protocols, and the controller can select a working protocol used by the primary chip and the secondary chip to work, and the plurality of protocols include at least one of the following: a PCIe protocol, a CCIX protocol, or a USB protocol.

The retimer provided in the third aspect corresponds to the retimer in the retimer application system in the first aspect. Therefore, for details of the retimer in the third aspect, refer to the foregoing descriptions of the application system in the first aspect and the retimer in the application system. Details are not described herein again.

According to a fourth aspect, a data transmission method is provided, including:

after first link training is completed, storing, by a retimer in a first storage area, an equalization parameter corresponding to each rate during the first link training, where data stored in the first storage area is not lost after the retimer performs a reset operation;

receiving, by the retimer, a reset indication, and performing the reset operation according to the reset indication; and after the reset operation is performed, invoking, by the retimer, the equalization parameter, and transparently transmitting a training sequence in second link training to a primary chip or a secondary chip based on the equalization parameter, to complete the second link training between the primary chip and the secondary chip, where the second link training is triggered by the reset operation.

With reference to the fourth aspect, in a first possible implementation of the fourth aspect, the retimer further includes a plurality of data processing circuits.

Optionally, the method further includes:

after the first link training is completed, bypassing, by the retimer, the plurality of data processing circuits, so that the retimer enters a low-delay mode; and correspondingly, after the second link training is completed, transparently transmitting, by the retimer, service data between the primary chip and the secondary chip in the low-delay mode.

With reference to the fourth aspect or the first possible implementation of the fourth aspect, in a second possible implementation, the first storage area is a storage area in a nonvolatile memory or firmware of the retimer.

With reference to the fourth aspect, the first possible implementation of the fourth aspect, or the second possible implementation of the fourth aspect, in a third possible implementation, the method further includes:

storing, by the retimer, the equalization parameter in a register during the first link training; and the step of storing the equalization parameter in the first storage area is:

after the first link training is completed, storing, in the first storage area, the equalization parameter that is stored in the register.

With reference to the third possible implementation of the fourth aspect, in a fourth possible implementation, the step of invoking, by the retimer, the equalization parameter includes:

during the second link training, storing, by the retimer, the equalization parameter that is stored in the first storage area in the register.

With reference to any one of the fourth aspect or the first to the fourth possible implementations of the fourth aspect, in a fifth possible implementation, the receiving, by the retimer, a reset indication includes:

after the first link training is completed, receiving, by the retimer, the reset indication sent by a BIOS.

With reference to any one of the fourth aspect or the first to the fourth possible implementations of the fourth aspect, in a sixth possible implementation, the receiving, by the retimer, a reset indication includes:

after the first link training is completed, receiving, by the retimer, the reset indication sent by the primary chip.

With reference to any one of the fourth aspect or the first to the sixth possible implementations of the fourth aspect, in a seventh possible implementation, the retimer includes a sending equalization circuit and a receiving equalization circuit, and after the retimer enters the low-delay mode, an output of the receiving equalization circuit is used as an input of the sending equalization circuit.

With reference to any one of the fourth aspect or the first to the seventh possible implementations of the fourth aspect, in an eighth possible implementation, the method further includes:

selecting, by the retimer from a plurality of indicated protocols, a working protocol used by the primary chip and the secondary chip to work, where the plurality of protocols include at least one of the following: a PCIe protocol, a CCIX protocol, or a USB protocol.

The method provided in the fourth aspect corresponds to the retimer in the third aspect and the retimer in the retimer application system in the first aspect. For details of the retimer in the fourth aspect, refer to the foregoing descriptions of the application system in the first aspect and the retimer in the application system. Details are not described herein again.

According to a fifth aspect, a retimer application system is provided, including a primary chip, a retimer, and a secondary chip, where the retimer includes a plurality of data processing circuits;
  after link training is completed, the retimer bypasses the plurality of data processing circuits, to enter a low-delay mode; and
  the retimer transparently transmits service data between the primary chip and the secondary chip in the low-delay mode.

For example, after the retimer is powered on, if the primary chip determines that the secondary chip is connected to a link, the link training is initiated. It should be understood that the link training may be performed in a link training manner known in the art. Details are no longer described in the embodiments. After the link training is completed, the retimer may bypass the plurality of data processing circuits, so that the retimer can enter the low-delay mode. After the retimer enters the low-delay mode, the plurality of data processing circuits no longer process a data stream. Then, the retimer may transparently transmit the service data between the primary chip and the secondary chip in the low-delay mode.

In the retimer application system provided in this embodiment, the link training is performed, to implement complete equalization and ensure a link compensation capability. After the link training is completed, the data processing circuits are bypassed, so that the retimer only forwards a received data stream without processing the data stream. Therefore, the retimer can transparently transmit the service data between the primary chip and the secondary chip, thereby reducing a transmission delay.

With reference to the fifth aspect, in a first possible implementation of the fifth aspect, the retimer further includes a link state machine, where the data processing circuit is configured to convert received serial data into a training sequence for processing by the link state machine, and convert the training sequence processed by the link state machine into serial data.

With reference to the fifth aspect or the first possible implementation of the fifth aspect, in a second possible implementation, the retimer includes a sending equalization circuit and a receiving equalization circuit, and after the retimer enters the low-delay mode, an output of the receiving equalization circuit is used as an input of the sending equalization circuit.

Further, the receiving equalization circuit may include a CTLE/DFB circuit. The sending equalization circuit may include a FFE circuit.

With reference to the fifth aspect, the first possible implementation of the fifth aspect, or the second possible implementation of the fifth aspect, in a third possible implementation, the retimer supports a plurality of protocols, and can select a working protocol used by the primary chip and the secondary chip to work, and the plurality of protocols include at least one of the following: a PCIe protocol, a CCIX protocol, or a USB protocol.

The retimer in this embodiment may support a plurality of high-speed buses, and is widely applied. In addition, during system design, a plurality of types of retimers do not need to be considered for use, so that hardware design complexity and subsequent verification workload can be reduced.

According to a sixth aspect, a retimer is provided, including a control circuit and a plurality of data processing circuits, where
  the control circuit is configured to: after link training is completed, bypass the plurality of data processing circuits, to enter a low-delay mode; and
  the control circuit is further configured to transparently transmit service data in the low-delay mode.

With reference to the sixth aspect, in a first possible implementation of the sixth aspect, the retimer further includes a link state machine, where the data processing circuit is configured to convert received serial data into a training sequence for processing by the link state machine, and convert the training sequence processed by the link state machine into serial data.

With reference to the sixth aspect or the first possible implementation of the sixth aspect, in a second possible implementation, the retimer includes a sending equalization circuit and a receiving equalization circuit, and after the retimer enters the low-delay mode, an output of the receiving equalization circuit is used as an input of the sending equalization circuit.

With reference to the sixth aspect, the first possible implementation of the sixth aspect, or the second possible implementation of the sixth aspect, in a third possible implementation, the retimer supports a plurality of protocols, and can select a working protocol used by the primary chip and the secondary chip to work, and the plurality of protocols include at least one of the following: a PCIe protocol, a CCIX protocol, or a USB protocol.

The retimer in the sixth aspect may correspond to the retimer in the retimer application system in the fifth aspect. Therefore, for the retimer in the sixth aspect, refer to descriptions of the retimer in the application system in the fifth aspect. Details are not described herein again.

According to a seventh aspect, a data transmission method is provided, including:
  after link training is completed, bypassing, by a retimer, a plurality of data processing circuits included in the retimer, to enter a low-delay mode; and
  transparently transmitting, by the retimer, service data between a primary chip and a secondary chip in the low-delay mode.

With reference to the seventh aspect, in a first possible implementation of the seventh aspect, the retimer further includes a link state machine, where the data processing circuit is configured to convert received serial data into a training sequence for processing by the link state machine, and convert the training sequence processed by the link state machine into serial data.

With reference to the seventh aspect or the first possible implementation of the seventh aspect, in a second possible implementation, the retimer includes a sending equalization circuit and a receiving equalization circuit, and after the retimer enters the low-delay mode, an output of the receiving equalization circuit is used as an input of the sending equalization circuit.

With reference to the seventh aspect, the first possible implementation of the seventh aspect, or the second possible implementation of the seventh aspect, in a third possible implementation, the retimer supports a plurality of protocols, and can select a working protocol used by the primary chip and the secondary chip to work, and the plurality of protocols include at least one of the following: a PCIe protocol, a CCIX protocol, or a USB protocol.

The method in the seventh aspect may correspond to the retimer in the retimer application system in the fifth aspect. Therefore, for the method in the seventh aspect, refer to descriptions of the retimer in the application system in the fifth aspect. Details are not described herein again.

According to an eighth aspect, a computer program product is provided. The computer program product includes a computer program (which may also be referred to as code or an instruction), and when the computer program is run, a computer is enabled to perform the method in any one of the second aspect, the fourth aspect, or the seventh aspect and the possible implementations of the second aspect, the fourth aspect, or the seventh aspect.

According to a ninth aspect, a computer readable medium is provided. The computer readable medium stores a computer program (which may also be referred to as code or an instruction), and when the computer program is run on a computer, the computer is enabled to perform the method in any one of the second aspect, the fourth aspect, or the seventh aspect and the possible implementations of the second aspect, the fourth aspect, or the seventh aspect.

According to a tenth aspect, a computer system is provided, including a processor, a memory, and one or more of the foregoing retimers.

DETAILED DESCRIPTION OF THE EMBODIMENTS

The following describes solutions of the embodiments with reference to accompanying drawings.

Figure 1:
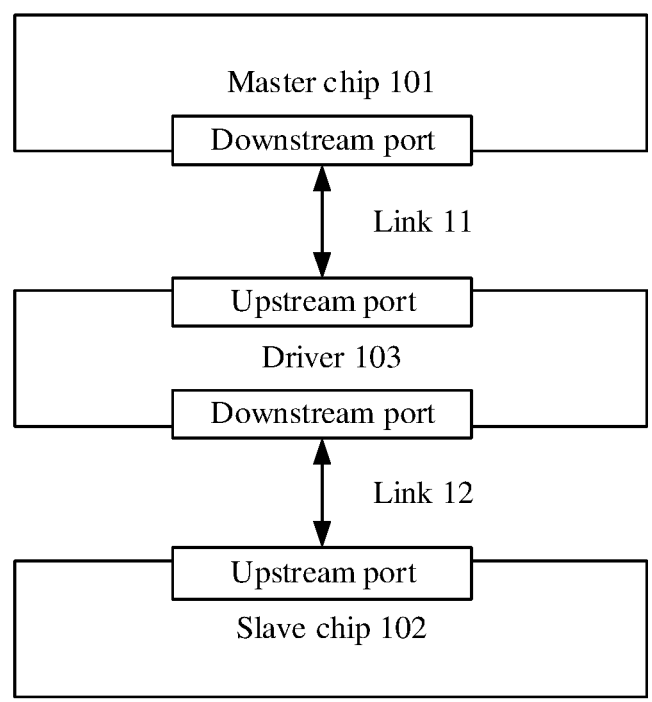
FIG. 1 is a schematic diagram of an application topology of a retimer according to the embodiments.

FIG. 1 is a block diagram of an example of an application topology of a retimer with a time sequence recovery function (hereinafter referred to as a retimer) according to the embodiments. Referring to FIG. 1, a downstream port (DSP) of a primary chip 101 may be connected to an upstream port of a secondary chip 102 by using a retimer 103. For example, a DSP of the primary chip 101 is connected to a USP of the retimer 103 by using a link 11, and a downstream port of the retimer 103 is connected to the upstream port of the secondary chip 102 by using a link 12.

Figure 2:
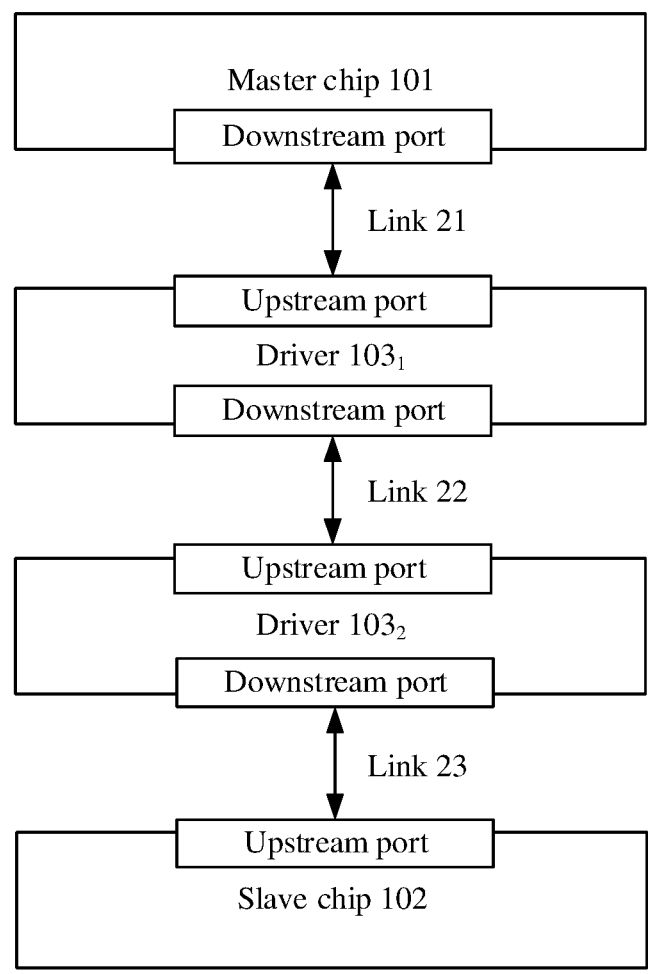
FIG. 2 is a schematic diagram of another application topology of a retimer according to the embodiments.

In addition, in the embodiments, a downstream port of the primary chip 101 may also be cascaded to a plurality of retimers to connect to an upstream port of the secondary chip 102. For example, FIG. 2 shows a case in which two retimers are cascaded. Referring to FIG. 2, the downstream port of the primary chip 101 is connected to an upstream port of a retimer $103_1$ by using a link 21, a downstream port of the retimer $103_1$ is connected to an upstream port of a retimer $103_2$ by using a link 22, and a downstream port of the retimer $103_2$ is connected to the upstream port of the secondary chip 102 by using a link 23.

In the topology structure shown in FIG. 1, for the retimer 103, the primary chip 101 is an upstream chip, and the secondary chip 102 is a downstream chip. In the topology structure shown in FIG. 2, for the retimer $103_1$, the primary chip 101 is an upstream chip, and the retimer $103_2$ is a downstream chip. For the retimer $103_2$, the retimer $103_1$ is an upstream chip, and the secondary chip 102 is a downstream chip. It should be understood that, if two ends of the link 23 are connected to a downstream port of the retimer $103_2$ and another retimer, for example, a retimer $103_3$, both an upstream chip and a downstream chip of the retimer $103_2$ are retimers.

The primary chip 101 may be a chip that includes a downstream port and that is not a retimer. For example, the primary chip 101 may be a root complex (RC), a switch chip (switch), or the like. The secondary chip 102 may be a chip that includes an upstream port and that is not a retimer. For example, the secondary chip 102 may be an endpoint device (endpoint) or a switch chip. The endpoint device may be a video card, a network adapter, an optical channel card, a storage card, a switch chip, or the like.

The links shown in FIG. 1 and FIG. 2, such as the link 11 and the link 21, may include one, two, four, eight, sixteen, or another quantity of lanes, and each lane may include a pair of received signals (Rx) and a pair of transmitted signals (Tx). The retimer (for example, the retimer 103, the retimer $103_1$, and the retimer $103_2$) complies with a link protocol, to implement communication between the primary chip 101 and the secondary chip 102. The link protocol may be, for example, another protocol such as a PCIe protocol, a CCIX protocol, or a USB protocol.

Figure 3:
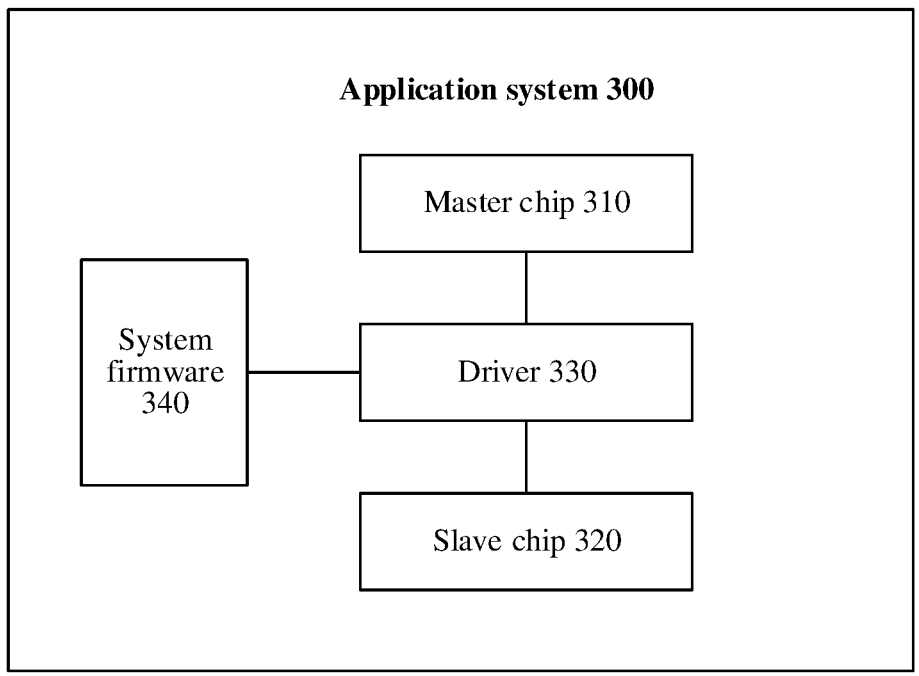
FIG. 3 is a schematic block diagram of a retimer application system according to the embodiments.

FIG. 3 is a schematic diagram of a retimer application system 300 according to the embodiments. As shown in FIG. 3, the application system 300 includes a primary chip 310, a secondary chip 320, and a retimer 330. For example, a downstream port of the primary chip 310 is connected to an upstream port of the retimer 330, and a downstream port of the retimer 330 is connected to an upstream port of the secondary chip 320. It should be understood that the "connection" herein includes a direct connection and an indirect connection. For example, the primary chip 310, the secondary chip 320, and the retimer 330 may be respectively the primary chip 101, the secondary chip 102, and the retimer 103 shown in FIG. 1. In this case, the retimer 330 is directly connected to the primary chip 310 and the secondary chip 330. For another example, the primary chip 310 and the secondary chip 320 may be the primary chip 101 and the secondary chip 102 shown in FIG. 2, and the retimer 330 may be the retimer $103_1$ or the retimer $103_2$ shown in FIG. 2. In this case, the retimer 330 is indirectly connected to the primary chip 310, or is indirectly connected to the secondary chip 330. Alternatively, the retimer 330 is indirectly connected to both the primary chip 310 and the secondary chip 320, for example, the upstream port of the retimer 330 is connected to another retimer, and the downstream port of the retimer 330 is also connected to another retimer.

After first link training is completed, the retimer 330 is configured to store, in a first storage area, an equalization parameter corresponding to each rate during the first link training, where data stored in the first storage area is not lost when the retimer 330 performs a reset operation.

The retimer 330 is configured to: receive a reset indication, and perform the reset operation according to the reset indication.

Second link training triggered by the reset indication is performed between the primary chip 310 and the secondary chip 320.

During the second link training, the retimer 330 is further configured to: invoke the equalization parameter, and transparently transmit a training sequence in the second link training to the primary chip 310 or the secondary chip 320 based on the equalization parameter, to complete the second link training between the primary chip 310 and the secondary chip 320. It should be noted that the transparent transmission means that a received signal is directly forwarded to another component without being processed. In the embodiments, that the retimer 330 transparently transmits the training sequence to the primary chip 310 (or the secondary chip 320) means that after receiving the training sequence, the retimer 330 directly transmits the training sequence to the primary chip 310 (or the secondary chip 320) without processing the training sequence.

The first link training is link training initiated when the primary chip 310 detects that the secondary chip 330 is connected to a link, or the primary chip 310 detects that the secondary chip 330 is connected to the primary chip by using a retimer (including the retimer 330).

The second link training refers to link training triggered by the reset operation performed by the retimer 330 after the retimer 330 receives the reset indication. During the second link training, the retimer 330 actually does not participate in the link training, and only transparently transmits the training sequence during the second link training.

The transparent transmission may also mean that the retimer 330 does not process a received data stream (for example, the training sequence), for example, does not perform serial-to-parallel conversion, decoding, parallel-to-serial conversion, encoding, or the like on the received data stream, and instead only forwards the data stream.

For example, when detecting that the secondary chip 320 is connected to a link, the primary chip 310 performs the first link training. The primary chip 310, the secondary chip 320, and the retimer 330 all participate during the first link training. For example, the primary chip 310, the secondary chip 320, and the retimer 330 are respectively the primary chip 101, the secondary chip 102, and the retimer 103 shown in FIG. 1. The first link training is link training of the downstream port of the primary chip 101 and the upstream port of the retimer 103 and link training of the downstream port of the retimer 103 and the upstream port of the secondary chip. The first link training includes an equalization process. The retimer 330 may obtain or acquire, during the first link training, the equalization parameter corresponding to each rate. The equalization parameter includes a sending equalization parameter and a receiving equalization parameter of the retimer 330. After the first link training is completed, the retimer 330 may store, in the first storage area, the equalization parameter corresponding to each rate during the first link training After the first link training is completed, the retimer 330 receives the reset indication, and the retimer 330 performs the reset operation when or after receiving the reset indication. The reset operation may be resetting all upstream ports and downstream ports of the retimer, or may be resetting an upstream port connected to the primary chip 310 and a downstream port connected to the secondary chip 320. The reset operation of the retimer 330 triggers the second link training between the primary chip 310 and the secondary chip 320, where the retimer 330 does not participate in the second link training. During the second link training between the primary chip 310 and the secondary chip 320, the retimer 330 invokes the equalization parameter, and transparently transmits the training sequence in the second link training between the primary chip and the secondary chip based on the equalization parameter.

In the retimer application system provided in the embodiments, the primary chip, the secondary chip, and the retimer perform the first link training, to implement link load balancing and ensure a link compensation capability. After the first link training is completed, the primary chip and the secondary chip perform the second link training triggered by the reset operation of the retimer. During the second link training, the retimer transparently transmits the training sequence between the primary chip and the secondary chip based on the equalization parameter obtained based on the first link training Therefore, based on implementation of normal second link training, efficiency of the second link training can be further improved. After the second link training is completed, the retimer may transparently transmit service data between the primary chip and the secondary chip, so that a transmission delay can be reduced.

Optionally, in an embodiment, the first storage area may be a storage area in a nonvolatile memory, and the nonvolatile memory may be, for example, an EEPROM. In addition, the first storage area may be alternatively a storage area in a volatile memory. The first storage area may be located inside the retimer 330, or may be located outside the retimer 330. This is not limited in the embodiments.

In addition, the first storage area may be a storage area in firmware of the retimer 330. In this case, a register write operation does not need to be performed when the equalization parameter is invoked.

For example, the first storage area may be alternatively an area used to store a parameter corresponding to another port of the retimer 330, and the another port is not connected to the primary chip 310 or the secondary chip 320. In this case, the reset operation may be resetting a port that is of the retimer 330 and that is connected to the primary chip 310 and the secondary chip 320. Because the another port is not reset, the equalization parameter stored in the area used to store the parameter corresponding to the another port is not lost after the reset operation.

Further, the volatile memory may be a memory in the retimer 330. The equalization parameter is stored in the retimer 330, so that a speed of invoking the equalization parameter can be improved.

Optionally, in an embodiment, during the first link training, the retimer 330 is further configured to store the equalization parameter in a register. After the first link training is completed, the retimer 330 is further configured to store, in the first storage area, the equalization parameter that is stored in the register.

It should be understood that the register may be a register configured to store an initial equalization parameter. However, this is not limited in the embodiments.

Further, during the second link training, the retimer 330 is further configured to store the equalization parameter that is stored in the first storage area in the register.

In addition, the primary chip 310 and the secondary chip 320 may separately store equalization parameters obtained during the first link training corresponding to the primary chip 310 and the secondary chip 320. In this way, these equalization parameters may be directly invoked during the second link training, so that the second link training can be quickly completed.

Optionally, in an embodiment, the application system 300 further includes system firmware 340. After the first link training is completed, the system firmware 340 is configured to send the reset indication to the retimer 330. The system firmware 340 may include a BIOS or a drive of the retimer 330.

The system firmware sends the reset indication, and there is no need to specially design the primary chip 310 and the secondary chip 320 or modify a standard negotiation sequence, so that the retimer 330 has quite good commonality.

Optionally, in another embodiment, after the first link training is completed, the primary chip 310 is configured to send the reset indication to the retimer 330.

The reset indication sent by the primary chip 310 may be a specific negotiation code stream, for example, denoted as a first negotiation code stream. When receiving the first negotiation code stream, the retimer 330 performs the reset operation.

Further, reset may be implemented by a program stored in primary chip firmware (different from the system firmware). In a running process of the program, a link is reset, and the retimer invokes a parameter after a control circuit detects that the link is reset. In this implementation, the retimer does not reset the link, and the primary chip resets the link.

Optionally, in an embodiment, the retimer 330 may support a plurality of protocols, for example, may support a high-speed bus protocol such as a PCIe protocol, a CCIX protocol, or a USB protocol, and can select one of the protocols for working.

The retimer in the embodiments may support a plurality of high-speed buses, and is widely applied. In addition, during system design, a plurality of types of retimers do not need to be considered for use, so that hardware design complexity and subsequent verification workload can be reduced.

In a possible implementation, protocol selection of the retimer may be implemented in the following manner.

a. During system design, in a scenario in which the retimer determines a protocol, one of the protocols may be selected by pulling up or down a specified pin of the retimer. For example, Table 1 shows a correspondence between a pin and a protocol.

TABLE 1

| PIN_A (pull up 1/ pull down 0) | PIN_B (pull up 1/ pull down 0) | Protocol |
|---|---|---|
| 0 | 0 | PCIe |
| 0 | 1 | CCIX |
| 1 | 0 | USB |
| ... | ... | ... |

In Table 1, PIN_A and PIN_B are two pins of the retimer, and protocol selection of the retimer may be implemented by performing a pull-up/pull-down operation on the two pins. For example, the pin PIN_A is pulled up and the pin PIN_B is pulled down, so that the retimer supports the USB protocol.

b. Through a management interface (for example, Smbus) defined in a standard, system software configures, after power-on, a protocol used by the retimer to work.

c. A protocol used by the retimer is configured by using a specific negotiation code stream (for example, denoted as a second negotiation code stream). In other words, a negotiation code stream may correspond to a protocol, and a corresponding protocol may be configured by using a corresponding negotiation code stream. It should be understood that the second negotiation code stream may be identified by the following link state machine 333.

Figure 4:
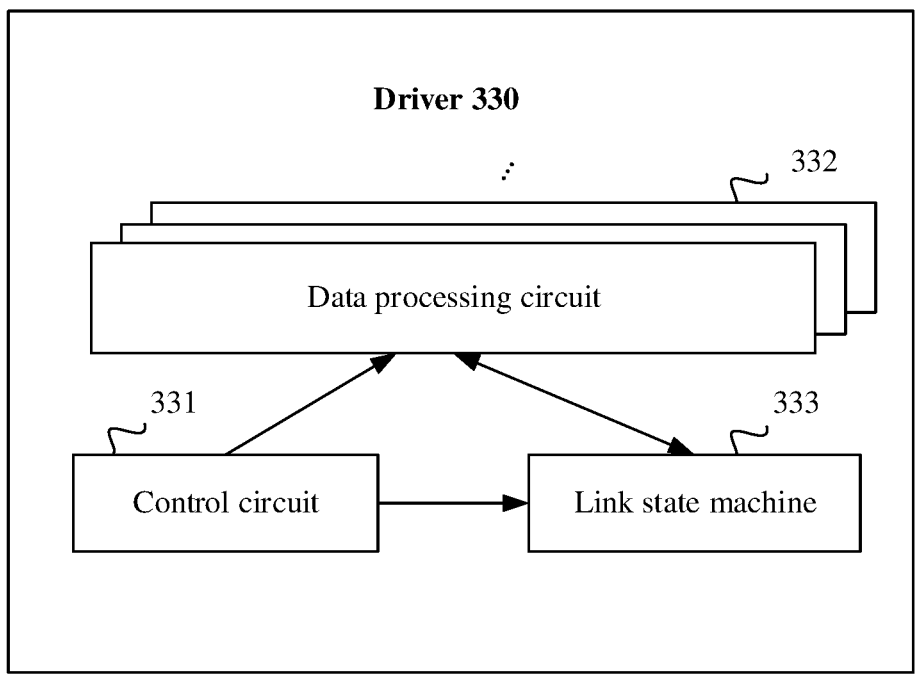
FIG. 4 is a block diagram of an example of a retimer according to the embodiments.
Figure 5:
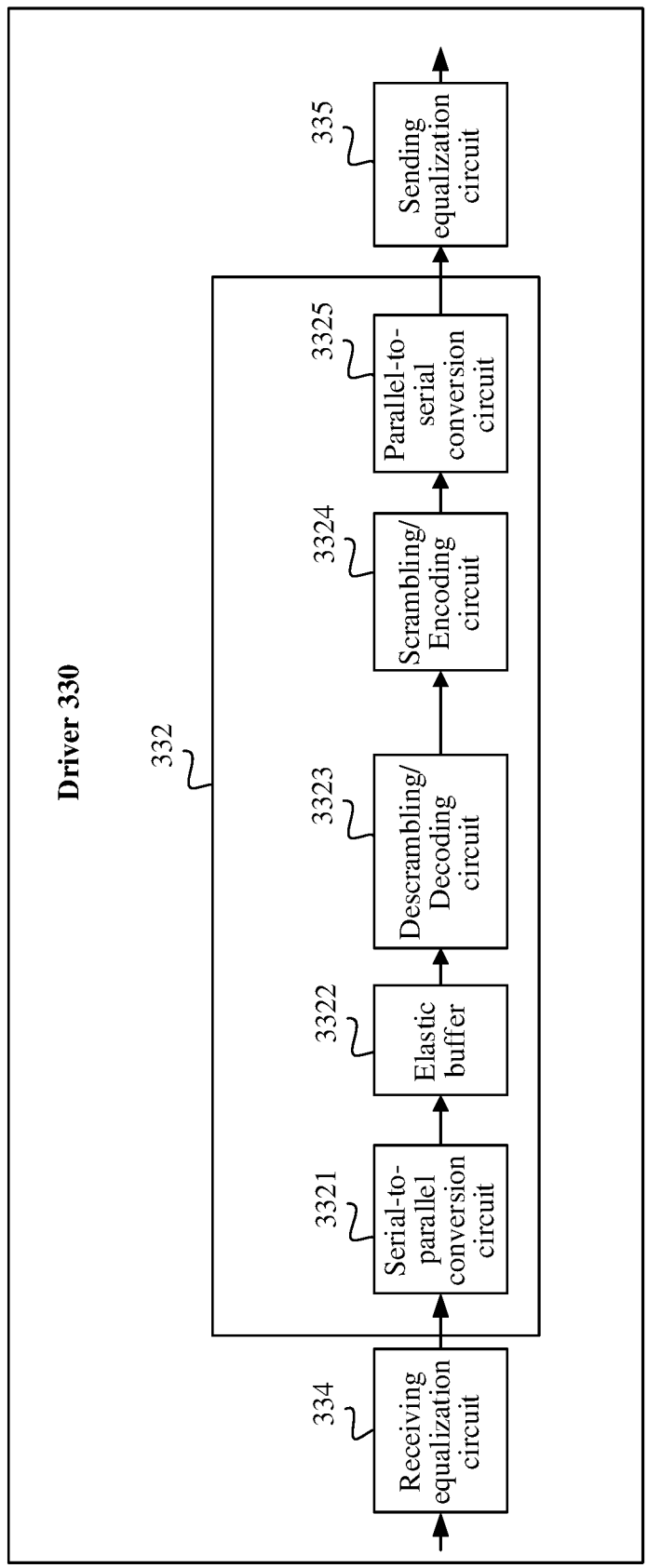
FIG. 5 is a block diagram of another example of a retimer according to the embodiments.

The following describes the retimer 330 in the application system 300 with reference to FIG. 4 and FIG. 5.

FIG. 4 is a schematic structural diagram of the retimer 330.

Optionally, in an embodiment, the retimer 300 may include a control circuit 331.

In a possible implementation, the control circuit 331 may perform the operations of storing the equalization parameter after the first link training is completed, invoking the equalization parameter during the second link training, and transparently transmitting the training sequence during the second link training based on the equalization parameter.

Optionally, in an embodiment, the retimer may further include a plurality of data processing circuits 332.

After the first link training is completed, the retimer 330 is further configured to bypass the plurality of data processing circuits 332 included in the retimer 330. Correspondingly, after the second link training is completed, the retimer 330 is further configured to transparently transmit service data between a primary chip 310 and a secondary chip 320.

For example, a manner of implementing the transparent transmission (for example, transparent transmission of the training sequence) is: after the first link training is completed, the retimer 330 bypasses the plurality of data processing circuits included in the retimer 330. A working mode is the low-delay mode after the retimer 330 bypasses the plurality of data processing circuits. In other words, after bypassing the plurality of data processing circuits 332, the retimer 330 enters the low-delay mode. In the low-delay mode, the plurality of data processing circuits 332 are in a bypass state, and the retimer 330 only transparently transmits a received data stream. After or when bypassing the plurality of data processing circuits 332, in other words, after or when the retimer enters the low-delay mode, the retimer 330 receives the reset indication, where the reset indication triggers the reset operation of the retimer 830. In this case, because the retimer 330 works in the low-delay mode, the retimer only forwards the training sequence during the second link training triggered by the reset operation. In addition, after the second link training is completed, the retimer 330 transmits the service data between the primary chip 310 and the secondary chip 320 in the low-delay mode, that is, the retimer 330 transparently transmits the service data between the primary chip 310 and the secondary chip 320.

The retimer performs the first link training, to implement link load balancing and ensure a link compensation capability. After the first link training is completed, the retimer performs the reset operation and invokes the equalization parameter obtained through the first link training. Because the data processing circuit is in the bypass state, the retimer only forwards the received training sequence without processing the training sequence, so that the second link training can be completed quickly. After the second link training, the retimer transmits the service data between the primary chip and the secondary chip in the low-delay mode, so that a transmission delay can be reduced.

It can be understood that the retimer 330 supports a plurality of lanes, and the plurality of lanes are a plurality of lanes connected to the primary chip 310 and the secondary chip 320. In addition, each lane corresponds to two data paths, one of the two data paths is used for sending, and the other is used for receiving. Structures of the two data paths used for receiving and sending may be the same, and each data path may correspond to a data processing circuit.

It should be further understood that the control circuit 331 in the retimer 330 may perform the foregoing operations of bypassing the plurality of data processing circuits 332 and transparently transmitting the service data between the primary chip 310 and the secondary chip 320 in the low-delay mode.

Optionally, in an embodiment, the retimer 330 further includes a link state machine 333. The link state machine 333 is configured to perform link training. The data processing circuit 332 is configured to: convert received serial data into a training sequence processed by the link state machine 333, and convert the training sequence processed by the link state machine 333 into serial data. As another understanding of the data processing circuit 332, the data processing circuit 332 may convert serial data into input data of the link state machine 333, and convert output data of the link state machine 333 into serial data. It should be understood that the input data and the output data of the link state machine 333 are in a same format as that of a link state machine of a retimer in the prior art.

It should be further understood that the link state machine 333 may perform the first link training.

Optionally, in an embodiment, after the first link training is completed, the retimer 330 may further bypass the link state machine 333. In this way, no data stream passes through the link state machine 333, so that a transmission delay can be further reduced. It should be understood that an operation of bypassing the link state machine 333 may be performed by the control circuit 331.

FIG. 5 is another schematic structural diagram of the retimer 330. It should be understood that FIG. 5 shows only one data processing circuit 332 of the plurality of data circuits 332. A same or similar structure may be used for another data processing circuit 332. It should be further understood that the retimer 330 shown in FIG. 5 may further include the control circuit 331 and the link state machine 333 shown in FIG. 4 and not shown in FIG. 5.

Optionally, in an embodiment, the retimer 330 further includes a receiving equalization circuit 334 and a sending equalization circuit 335. After the retimer 330 enters the low-delay mode, an output of the receiving equalization circuit 334 is used as an input of the sending equalization circuit 335.

Further, the receiving equalization circuit 334 and the sending equalization circuit 335 are connected by using the data processing circuit 332.

It should be understood that, as described above, each of two data paths corresponding to each of the plurality of lanes supported by the retimer 330 may correspond to one data processing circuit. In addition, each data path may further correspond to one receiving equalization circuit 334 and one sending equalization circuit 335.

After the plurality of data processing circuits are bypassed, data passes through only the receiving equalization circuit and the sending equalization circuit, and does not pass through the plurality of data processing circuits. Therefore, a delay caused by data processing of the data processing circuit can be avoided.

For example, the receiving equalization circuit 334 may include a CTLE/DFE circuit. The sending equalization circuit 335 may include a FFE circuit.

Optionally, in an embodiment, the data processing circuit 332 may include a serial-to-parallel conversion circuit 3321, an elastic buffer 3322, a descrambling/decoding circuit 3323, a scrambling/encoding circuit 3324, and a parallel-to-serial conversion circuit 3325.

The serial-to-parallel conversion circuit 3321 is configured to convert serial data output by the receiving equalization circuit 334 into parallel data. The elastic buffer 3322 may be a first in first out (FIFO) queue, and is configured to buffer data. To prevent the elastic buffer 3322 from overflowing, the link state machine 333 may irregularly add or delete an SKP sequence in the elastic buffer circuit 3322. The descrambling/decoding circuit 3323 is configured to descramble/decode data output by the elastic buffer 3322. The link state machine 333 can identify descrambled/decoded data, and perform corresponding processing according to a property of the descrambled/decoded data. For example, during first link training, the link state machine identifies that the decoded data is a training sequence, and therefore performs link training.

The scrambling/encoding circuit 3324 is configured to: scramble/encode data that needs to be sent, to obtain data that conforms to a protocol, and output the data to the parallel-to-serial conversion circuit 3325. The parallel-to-serial conversion circuit 3325 is configured to: convert parallel data into serial data and output the serial data to the sending equalization circuit. For example, during the first link training, after the link state machine processes the training sequence, the scrambling/encoding circuit 3324 scrambles/encodes the training sequence, and then outputs the training sequence to the parallel-to-serial conversion circuit 3325. The parallel-to-serial conversion circuit 3325 converts the training sequence into serial data, and finally the sending equalization circuit 335 sends the serial data.

In the retimer in the embodiments, in a data transmission process, data passes through only the receiving equalization circuit and the sending equalization circuit, and there is no need to first perform serial-to-parallel conversion, buffering, and descrambling/decoding, and then perform scrambling/encoding and parallel-to-serial conversion on the received data according to a protocol stipulation. Instead, a circuit obtained after equalization implements bitwise processing and forwarding to avoid a delay caused by operations such as serial-to-parallel conversion, buffering, descrambling/decoding, scrambling/encoding, and parallel-to-serial conversion, thereby implementing a low-delay function.

In addition, based on simulation estimation, compared with a retimer in an existing standard, when only the sending equalization circuit and the receiving equalization circuit are reserved, and the serial-to-parallel conversion circuit, the elastic buffer, the descrambling/decoding circuit, the scrambling/encoding circuit, and the parallel-to-serial conversion circuit are bypassed, the retimer provided in the embodiments can reduce a delay to about 5 ns, thereby improving system performance.

It should be understood that the foregoing modules included in the data processing circuit 332 may be implemented in a manner known to a person or ordinary skill in the art, and details are not described herein again. It should be understood that the modules listed herein may be separately implemented by one component or an independent circuit, or a plurality of modules may be implemented by one component or an independent circuit, provided that the data processing circuit 332 can implement a function thereof.

It should be further understood that a connection relationship between the modules listed herein is merely an example for description, and the connection relationship between the modules may be alternatively in another form, provided that a basic function of the retimer can be implemented. Alternatively, in actual use, if one or more of the foregoing modules included in the data processing circuit 332 are not required to process the training sequence during link training, the data processing circuit 332 may correspondingly not include the one or more modules.

In addition, it should be further understood that the retimer may further include another basic functional module, for example, a clock and data recovery (CDR) circuit and a phase locked loop (PLL). However, this is not limited in the embodiments. For details of the CDR circuit and the PLL, refer to descriptions about a CDR circuit and a PLL in an existing retimer. Details are not described herein again.

Figure 6:
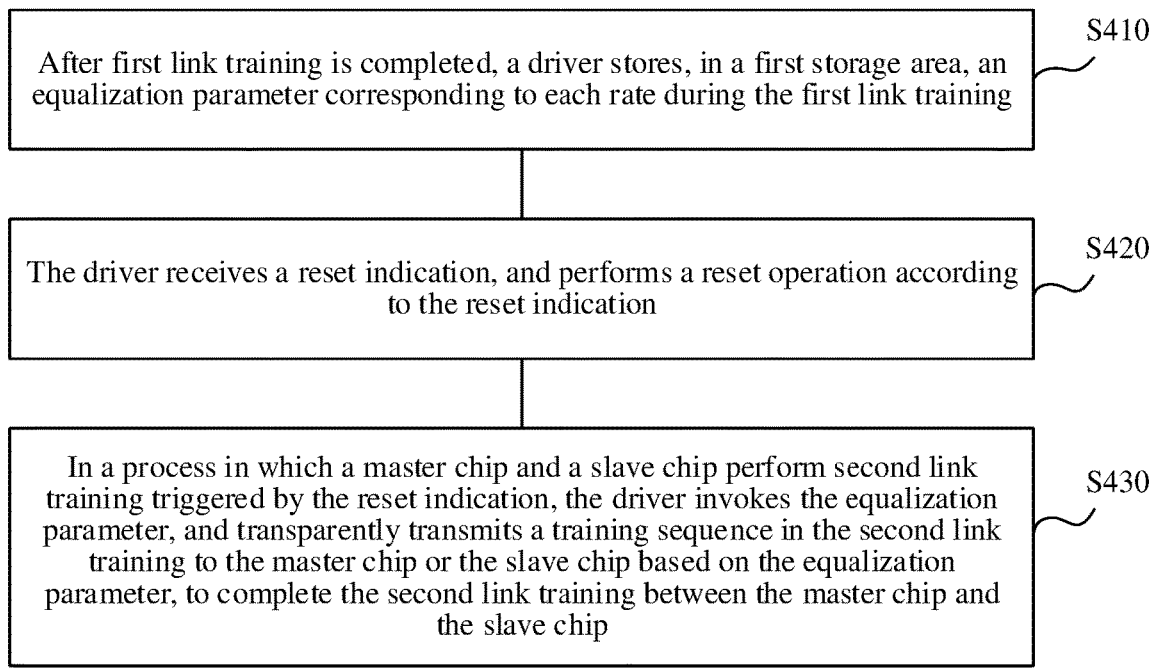
FIG. 6 is a schematic flowchart of a data transmission method according to the embodiments

FIG. 6 shows a data transmission method according to the embodiments. The method may be applied to the application system shown in FIG. 3.

S410: After first link training is completed, a retimer stores, in a first storage area, an equalization parameter corresponding to each rate during the first link training, where data stored in the first storage area is not lost when the retimer performs a reset operation.

S420: The retimer receives a reset indication, and performs the reset operation according to the reset indication.

S430: In a process in which a primary chip and a secondary chip perform second link training triggered by the reset indication, the retimer invokes the equalization parameter, and transparently transmits a training sequence in the second link training to the primary chip or the secondary chip based on the equalization parameter, to complete the second link training between the primary chip and the secondary chip.

In the method provided in the embodiments, the primary chip, the secondary chip, and the retimer perform the first link training, to implement link load balancing and ensure a link compensation capability. After the first link training is completed, the primary chip and the secondary chip perform the second link training triggered by the reset operation of the retimer. During the second link training, the retimer transparently transmits the training sequence between the primary chip and the secondary chip based on the equalization parameter obtained based on the first link training. Therefore, based on implementation of normal second link training, efficiency of the second link training can be further improved. After the second link training is completed, the retimer may transparently transmit service data between the primary chip and the secondary chip, so that a transmission delay can be reduced.

Optionally, in an embodiment, the first storage area is a storage area in a nonvolatile memory or firmware of a retimer.

Optionally, in an embodiment, the method further includes:

after the first link training is completed, bypassing, by the retimer, a plurality of data processing circuits included in the retimer, so that the retimer enters a low-delay mode; and correspondingly, after the second link training is completed, transparently transmitting, by the retimer, the service data between the primary chip and the secondary chip in the low-delay mode.

Optionally, in an embodiment, the retimer further includes a link state machine, where the data processing circuit is configured to convert received serial data into a training sequence for processing by the link state machine, and convert the training sequence processed by the link state machine into serial data.

Optionally, in an embodiment, the method further includes:

storing, by the retimer, the equalization parameter in a register during the first link training; and the step of storing the equalization parameter in the first storage area is:

after the first link training is completed, storing, by the retimer, the equalization parameter that is stored in the register in the first storage area.

Optionally, in an embodiment, the step of invoking, by the retimer, the equalization parameter includes:

storing, by the retimer, the equalization parameter that is stored in the first storage area in the register.

Optionally, in an embodiment, the method further includes:

after the first link training is completed, sending, by a BIOS, the reset indication to the retimer.

Optionally, in an embodiment, the method further includes:

after the first link training is completed, sending, by the primary chip, the reset indication to the retimer.

Optionally, in an embodiment, the retimer includes a sending equalization circuit and a receiving equalization circuit. After the retimer enters the low-delay mode, an output of the receiving equalization circuit is used as an input of the sending equalization circuit.

Optionally, in an embodiment, the retimer supports a plurality of protocols, and can select a working protocol used by the primary chip and the secondary chip to work, and the plurality of protocols include at least one of the following: a PCIe protocol, a CCIX protocol, or a USB protocol.

For details of the method shown in FIG. 6, refer to the foregoing description of the application system 300. Details are not described herein again.

The embodiments further provide a retimer. For the retimer, refer to the foregoing description of the retimer 330. Details are not described in the embodiments.

Figure 7:
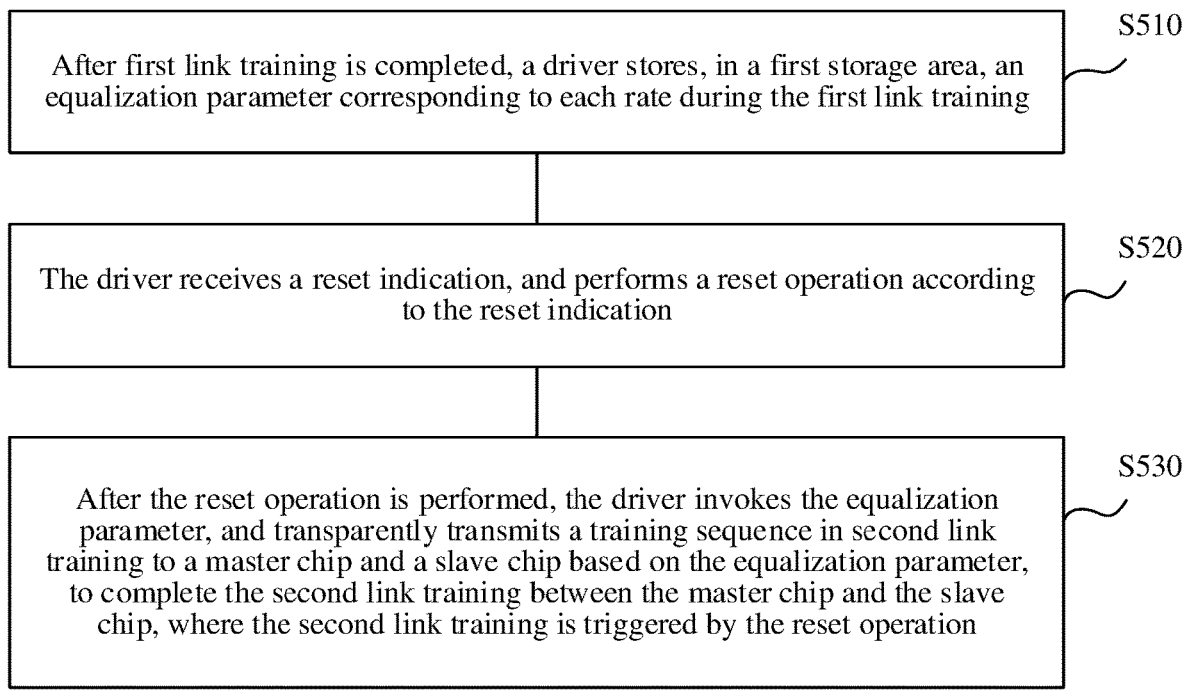
FIG. 7 is a schematic flowchart of another data transmission method according to the embodiments.

FIG. 7 shows another data transmission method according to the embodiments. A retimer in the method may be the retimer 330 in the application system 300.

S510: After first link training is completed, the retimer stores, in a first storage area, an equalization parameter corresponding to each rate during the first link training, where data stored in the first storage area is not lost after the retimer performs a reset operation.

S520: The retimer receives a reset indication, and performs the reset operation according to the reset indication.

S530: After the reset operation is performed, the retimer invokes the equalization parameter, and transparently transmits a training sequence in the second link training to the primary chip or the secondary chip based on the equalization parameter, to complete the second link training between the primary chip and the secondary chip, where the second link training is triggered by the reset operation.

Optionally, in an embodiment, the retimer further includes a plurality of data processing circuits.

The method further includes:

after the first link training is completed, bypassing, by the retimer, a plurality of data processing circuits, so that the retimer enters a low-delay mode; and correspondingly, after the second link training is completed, transparently transmitting, by the retimer, the service data between the primary chip and the secondary chip in the low-delay mode.

Optionally, in an embodiment, the first storage area is a storage area in a nonvolatile memory or firmware of a retimer.

Optionally, in an embodiment, the method further includes:

storing, by the retimer, the equalization parameter in a register during the first link training; and the step of storing the equalization parameter in the first storage area is:

after the first link training is completed, storing, in the first storage area, the equalization parameter that is stored in the register.

Optionally, in an embodiment, the step of invoking, by the retimer, the equalization parameter includes:

during the second link training, storing, by the retimer, the equalization parameter that is stored in the first storage area in the register.

Optionally, in an embodiment, the receiving, by the retimer, a reset indication includes:

after the first link training is completed, receiving, by the retimer, the reset indication sent by a BIOS.

Optionally, in an embodiment, the receiving, by the retimer, a reset indication includes:

after the first link training is completed, receiving, by the retimer, the reset indication sent by the primary chip.

Optionally, in an embodiment, the retimer includes a sending equalization circuit and a receiving equalization circuit. After the retimer enters the low-delay mode, an output of the receiving equalization circuit is used as an input of the sending equalization circuit.

Optionally, in an embodiment, the method further includes:

selecting, by the retimer from a plurality of indicated protocols, a working protocol used by the primary chip and the secondary chip to work, where the plurality of protocols include at least one of the following: a PCIe protocol, a CCIX protocol, or a USB protocol.

For details of the method shown in FIG. 7, refer to the foregoing description of the retimer of the application system 300. Details are not described herein again.

Figure 8:
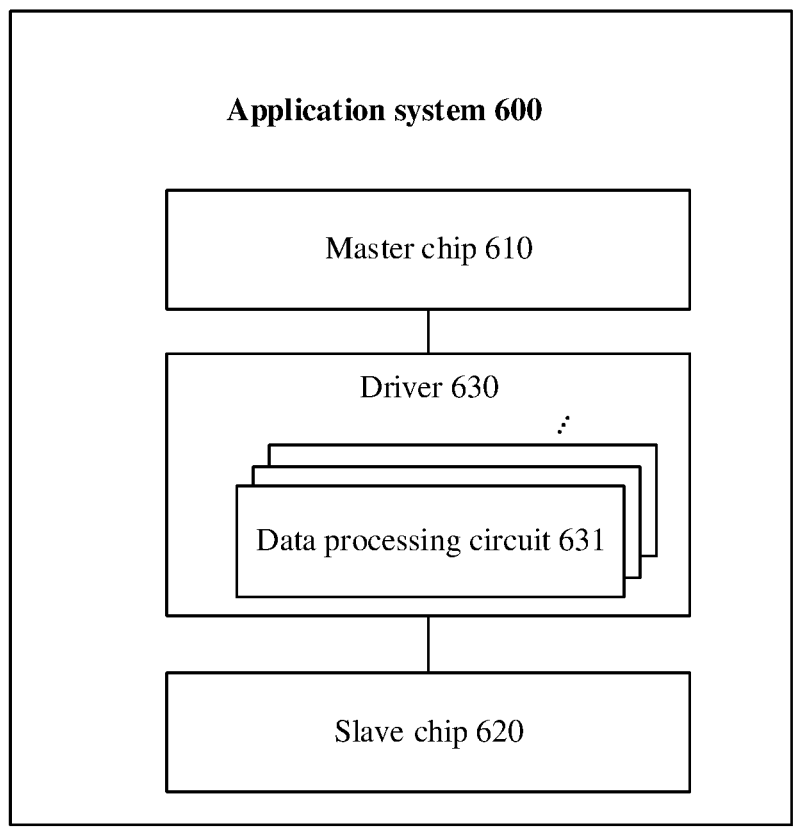
FIG. 8 is a schematic block diagram of another retimer application system according to the embodiments.

FIG. 8 is a schematic diagram of another retimer application system 600 according to the embodiments. As shown in FIG. 6, the application system 600 includes a primary chip 610, a secondary chip 620, and a retimer 630. For example, a downstream port of the primary chip 610 is connected to an upstream port of the retimer 630, and a downstream port of the retimer 630 is connected to an upstream port of the secondary chip 620. It should be understood that the "connection" herein includes a direct connection and an indirect connection. For example, the primary chip 610, the secondary chip 620, and the retimer 630 may be respectively the primary chip 101, the secondary chip 102, and the retimer 103 shown in FIG. 1. In this case, the retimer 630 is directly connected to the primary chip 610 and the secondary chip 630. For another example, the primary chip 610 and the secondary chip 620 may be the primary chip 101 and the secondary chip 102 shown in FIG. 2, and the retimer 630 may be the retimer $103_1$ or the retimer $103_2$ shown in FIG. 2. In this case, the retimer 630 is indirectly connected to the primary chip 610, or is indirectly connected to the secondary chip 630. Alternatively, the retimer 630 is indirectly connected to both the primary chip 610 and the secondary chip 620, for example, the upstream port of the retimer 630 is connected to another retimer, and the downstream port of the retimer 630 is also connected to another retimer.

The retimer 630 includes a plurality of data processing circuits 631.

After link training is completed, the retimer 630 is configured to bypass the plurality of data processing circuits 631, to enter a low-delay mode; and the retimer transparently transmits service data between the primary chip 610 and the secondary chip 620 in the low-delay mode.

For example, after the retimer 630 is powered on, if the primary chip 610 determines that the secondary chip 620 is connected to a link, the link training is initiated. It should be understood that the link training may be performed in a link training manner known in the art. Details are no longer described in the embodiments. After the link training is completed, the retimer 630 may bypass the plurality of data processing circuits 631, so that the retimer 630 can enter the low-delay mode. After the retimer 630 enters the low-delay mode, the plurality of data processing circuits 631 no longer process a data stream. Then, the retimer 630 may transparently transmit the service data between the primary chip 610 and the secondary chip 620 in the low-delay mode.

In the retimer application system provided in the embodiments, the link training is performed, to implement complete equalization and ensure a link compensation capability. After the link training is completed, the data processing circuits are bypassed, so that the retimer only forwards a received data stream without processing the data stream. Therefore, the retimer can transparently transmit the service data between the primary chip and the secondary chip, thereby reducing a transmission delay.

It can be understood that the retimer 630 supports a plurality of lanes, and the plurality of lanes are a plurality of lanes connected to the primary chip 610 and the secondary chip 620. In addition, each lane corresponds to two data paths, one of the two data paths is used for sending, and the other is used for receiving. Structures of the two data lanes used for receiving and sending may be the same, and each data path may correspond to a data processing circuit 631.

Figure 9:
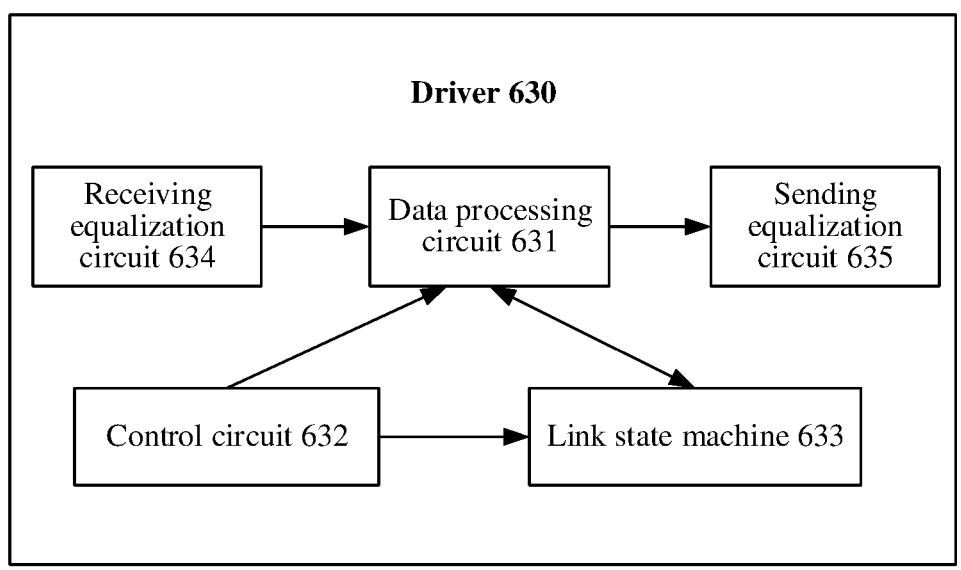
FIG. 9 is a block diagram of an example of a retimer according to the embodiments.

FIG. 9 is a schematic structural diagram of the retimer 630. Referring to FIG. 9, the retimer 630 includes a data processing circuit 631. It should be understood that FIG. 9 shows only one data processing circuit 631, and a structure of another data processing circuit of the plurality of data processing circuits 631 is the same or similar.

Optionally, in an embodiment, the retimer 630 may further include a control circuit 632. The control circuit may be configured to perform the foregoing functions of bypassing the plurality of data processing circuits 631 and transparently transmitting the service data between the primary chip 610 and the secondary chip 620.

Optionally, in an embodiment, the retimer 630 further includes a link state machine 633. The link state machine 633 is configured to perform link training, and the data processing circuit 631 is configured to: convert received serial data into a training sequence processed by the link state machine 633, and convert the training sequence processed by the link state machine 633 into serial data.

As another understanding of the data processing circuit 631, the data processing circuit 631 may convert serial data into input data of the link state machine 633, and convert output data of the link state machine 633 into serial data. It should be understood that the input data and the output data of the link state machine 633 are in a same format as that of a link state machine in a retimer in the prior art.

It should be further understood that the link state machine 633 may perform the link training.

Optionally, in an embodiment, the retimer 630 further includes a receiving equalization circuit 634 and a sending equalization circuit 635. After the retimer 630 enters the low-delay mode, an output of the receiving equalization circuit 634 is used as an input of the sending equalization circuit 635.

Further, the receiving equalization circuit 634 and the sending equalization circuit 635 are connected by using the data processing circuit 632.

It should be understood that, as described above, each of two data paths corresponding to each of the plurality of lanes supported by the retimer 630 may correspond to one data processing circuit. In addition, each data path may further correspond to one receiving equalization circuit 634 and one sending equalization circuit 635.

After the plurality of data processing circuits are bypassed, data passes through only the receiving equalization circuit and the sending equalization circuit, and does not pass through the plurality of data processing circuits. Therefore, a delay caused by data processing of the data processing circuit can be avoided.

For example, the receiving equalization circuit 634 may include a CTLE/DFE circuit. The sending equalization circuit 635 may include a FFE circuit.

Optionally, in an embodiment, for a specific structure of the data processing circuit 631, refer to the data processing circuit 332 shown in FIG. 5 and the foregoing description of the data processing circuit 332 shown in FIG. 5. Details are not described herein again.

In the retimer in the embodiments, in a data transmission process, data passes through only the receiving equalization circuit and the sending equalization circuit, and there is no need to first perform serial-to-parallel conversion, buffering, and descrambling/decoding, and then perform scrambling/encoding and parallel-to-serial conversion on the received data according to a protocol stipulation. Instead, a circuit obtained after equalization implements bitwise processing and forwarding to avoid a delay caused by operations such as serial-to-parallel conversion, buffering, descrambling/decoding, scrambling/encoding, and parallel-to-serial conversion, thereby implementing a low-delay function.

In addition, based on simulation estimation, compared with a retimer in an existing standard, when only the sending equalization circuit and the receiving equalization circuit are reserved, and the serial-to-parallel conversion circuit, the elastic buffer, the descrambling/decoding circuit, the scrambling/encoding circuit, and the parallel-to-serial conversion circuit are bypassed, the retimer provided in the embodiments can reduce a delay to about 5 ns, thereby improving system performance.

In addition, it should be further understood that the retimer 630 may further include another basic functional module, for example, a CDR circuit and a PLL. However, this is not limited in the embodiments. For details of the CDR circuit and the PLL, refer to descriptions about a CDR circuit and a PLL in an existing retimer. Details are not described herein again.

The embodiments further provide a retimer. For the retimer, refer to the foregoing description of the retimer 630. Details are not described in the embodiments.

Figure 10:
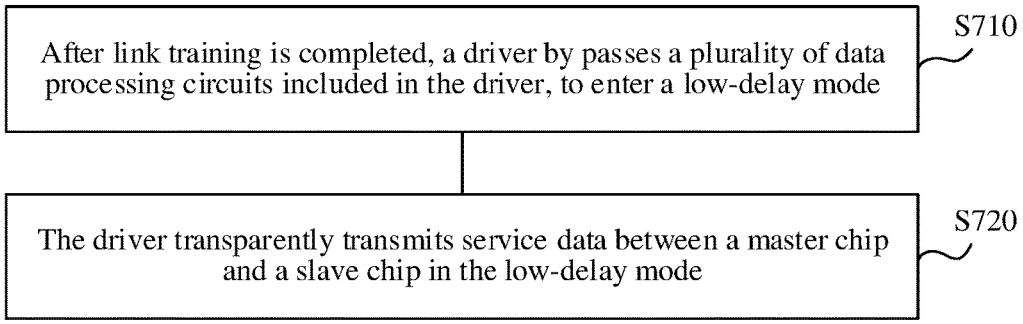
FIG. 10 is a schematic flowchart of another data transmission method according to the embodiments.

FIG. 10 is a flowchart of an example of a data transmission method according to the embodiments. The method may be applied to the retimer 630 in the application system 600.

S710: After link training is completed, a retimer bypasses a plurality of data processing circuits included in the retimer, to enter a low-delay mode.

S720: The retimer transparently transmits service data between a primary chip and a secondary chip in the low-delay mode.

The retimer further includes a link state machine, where the data processing circuit is configured to convert received serial data into a training sequence for processing by the link state machine, and convert the training sequence processed by the link state machine into serial data.

Optionally, in an embodiment, the retimer includes a sending equalization circuit and a receiving equalization circuit. After the retimer enters the low-delay mode, an output of the receiving equalization circuit is used as an input of the sending equalization circuit.

Optionally, in an embodiment, the retimer supports a plurality of protocols, and can select a working protocol used by the primary chip and the secondary chip to work, and the plurality of protocols include at least one of the following: a PCIe protocol, a CCIX protocol, or a USB protocol.

For details of the method shown in FIG. 10, refer to the description about the retimer 630 in the application system 600. Details are not described herein again.

Figure 11:
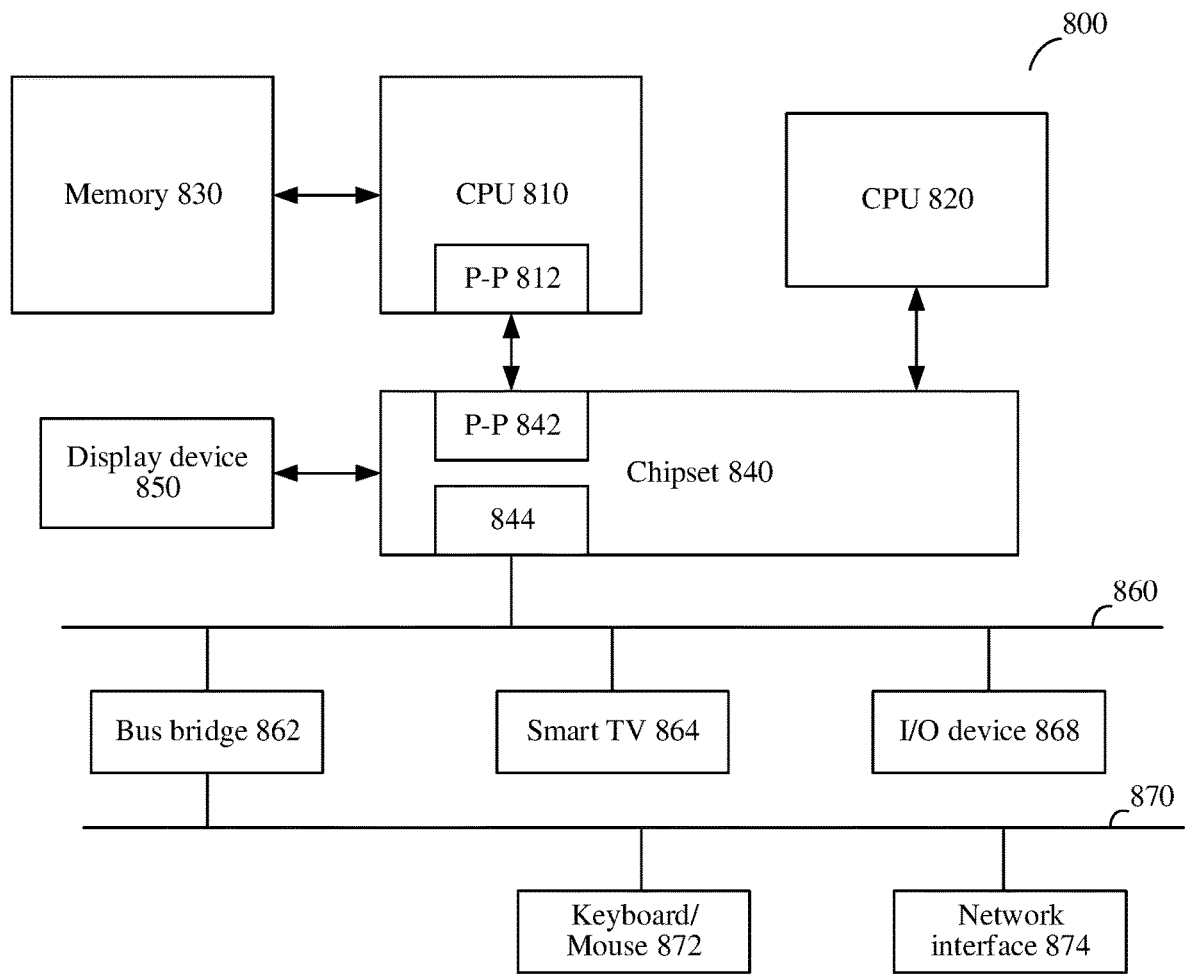
FIG. 11 is a schematic block diagram of a system according to the embodiments.

FIG. 11 is a schematic diagram of a system 800 that may be combined with a technology according to the embodiments. For example, the technology may be incorporated into an interconnection or an interface in the system 800.

Referring to FIG. 11, the system 800 includes, but is not limited to, a desktop computer, a notebook computer, a network book, a tablet computer, a notebook computer, a personal digital assistant (PDA), a server, a workstation, a mobile phone, a mobile computing device, a smartphone, an Internet device, or any other type of computing device.

In a possible implementation, the system 800 may include a processor, for example, a processor 810. In another possible implementation, the system 800 may include a plurality of processors, for example, include processors 810 and 820. The processor 820 has logic similar to or the same as that of the processor 810, or the processor 820 has logic completely independent of that of the processor 810. The processor may be a central processing unit (CPU), the processor may alternatively be another general purpose processor, a digital signal processor (DSP), an application specific integrated circuit (ASIC), a field programmable gate array (FPGA) or another programmable logical device, a discrete gate or transistor logic device, or a discrete hardware component. The general purpose processor may be a microprocessor, or the processor may be any conventional processor or the like.

In a possible implementation, the system 800 may include a memory 830. The processor 810 can access the memory 830 and has a function of communicating with the memory 830. The memory 830 stores information and an instruction to be executed by the processor 810. The memory 830 may include a volatile memory and/or a nonvolatile memory. The nonvolatile memory may be a read-only memory (ROM), a programmable read-only memory (PROM), an erasable programmable read-only memory (EPROM), an EEPROM, or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

In a possible implementation, the processors 810 and 820 may communicate with a chipset 840. In a possible implementation, the chipset 840 is connected to the processor 810 by using point-to-point (P-P) interfaces 842 and 812. The interfaces 842 and 812 may communicate based on any possible P-P communication protocol.

In a possible implementation, the chipset 840 may communicate with a display device 850 and another device by using an interface 844. The another device is a bus bridge 862, a smart TV 864, an I/O device 868, a keyboard/mouse 872, and a network interface 874 shown in the figure. The display device 850 includes, but is not limited to, a liquid crystal display (LCD), a plasma, and a cathode ray tube (CRT).

In a possible implementation, the chipset 840 may be connected to the another device for communication by using one or more buses 860 and 870. In a possible implementation, the buses 860 and 870 may be interconnected by using the bus bridge 862.

In a possible implementation, the network interface 874 is implemented by using any type of well-known network interface standard, including, but not limited to, an Ethernet interface, a USB interface, a PCIe interface, a CCIX interface, a wireless interface, and/or any other suitable type of interface.

It should be understood that although some modules in FIG. 11 are depicted as separate modules in the system 800, functions performed by some of these modules may be integrated in a single semiconductor circuit, or may be implemented by using two or more separate integrated circuits.

All or some of the foregoing embodiments may be implemented using software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

The term "and/or" used herein describes only an association relationship for describing associated objects and represents that three relationships may exist. For example, A and/or B may represent the following three cases: only A exists, both A and B exist, and only B exists. In addition, the character "I" in generally indicates an "or" relationship between the associated objects.

It should be understood that sequence numbers of the foregoing processes do not mean execution sequences in various embodiments of the embodiments. The execution sequences of the processes should be determined according to functions and internal logic of the processes, and should not be construed as any limitation on the implementation processes of the embodiments.

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and design constraint conditions of the solutions. A person of ordinary skill in the art may use different methods to implement the described functions for each particular application, but it should not be considered that the implementation goes beyond the scope of the embodiments.

It may be clearly understood by a person of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided, it should be understood that the system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the solutions of the embodiments essentially, or the part contributing to the prior art, or some of the solutions may be implemented in a form of a software product. The software product is stored in a storage medium, and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a ROM, a RAM, a magnetic disk, or an optical disc.

The foregoing descriptions are merely implementations of the embodiments, but are not intended to be limiting. Any variation or replacement readily figured out by a person of ordinary skill in the art within the scope of the embodiments shall fall within the scope.

What is claimed is:

1. An application system, comprising:
   a primary chip;
   a retimer comprising a plurality of data processing circuits; and
   a secondary chip, wherein the primary chip, the second chip, and the retimer participate in first link training, and, after the first link training is completed, the retimer is configured to:
   store, in a first storage area, an equalization parameter corresponding to each rate during the first link training, and data stored in the first storage area is not lost when the retimer performs a reset operation;
   receive a reset indication;
   perform the reset operation according to the reset indication, wherein the primary chip and the secondary chip are configured to perform second link training triggered by the reset indication;
   during the second link training, transparently transmit a training sequence and invoke the equalization parameter, wherein the retimer is configured to bypass the plurality of data processing circuits in the retimer while transmitting the training sequence; and
   after the second link training is completed, transparently transmit service data between the primary chip and the secondary chip based on the equalization parameter.

2. The application system according to claim 1, wherein the first storage area is a storage area in a nonvolatile memory or firmware of the retimer.

3. The application system according to claim 1, wherein after the first link training is completed, the retimer is further configured to enter a low-delay mode.

4. The application system according to claim 3, wherein the retimer further comprises a link state machine, and each data processing circuit of the plurality of data processing circuits is configured to convert the training sequence processed by the link state machine into serial data.

5. The application system according to claim 1, wherein during the first link training, the retimer is further configured to:
   store the equalization parameter in a register, and, after the first link training is completed,
   store, in the first storage area, the equalization parameter that is stored in the register.

6. The application system according to claim 5, wherein during the second link training, the retimer is further configured to store the equalization parameter that is stored in the first storage area in the register.

7. The application system according to claim 1, wherein the application system further comprises a basic input/output system (BIOS), and after the first link training is completed, the BIOS is configured to send the reset indication to the retimer; or the primary chip is configured to send the reset indication to the retimer.

8. The application system according to claim 3, wherein the retimer comprises:
   a sending equalization circuit; and
   a receiving equalization circuit, and after the retimer enters the low-delay mode, an output of the receiving equalization circuit is used as an input of the sending equalization circuit.

9. The application system according to claim 1, wherein the retimer supports a plurality of protocols and is further configured to select a working protocol used by the primary chip and the secondary chip to work, and the plurality of protocols include at least one of the following: a peripheral component interconnect express (PCIe) protocol, a cache coherent interconnect for accelerators (CCIX) protocol, or a universal serial bus (USB) protocol.

10. A data transmission method, comprising:
    after a primary chip, a second chip, and a retimer, wherein the retimer comprises a plurality of data processing circuits, participate in first link training, and the first link training is completed, storing, by the retimer in a first storage area, an equalization parameter corresponding to each rate during the first link training, wherein data stored in the first storage area is not lost when the retimer performs a reset operation;
    receiving, by the retimer, a reset indication;
    performing the reset operation according to the reset indication;
    in a process in which the primary chip and the secondary chip perform second link training triggered by the reset indication,
    during the second link training, transparently transmit a training sequence and invoke, by the retimer, the equalization parameter, wherein the retimer is configured to bypass the plurality of data processing circuits in the retimer while transmitting the training sequence; and
    after the second link training is completed, transparently transmitting service data between the primary chip and the secondary chip based on the equalization parameter.

11. The method according to claim 10, further comprising:
    after the first link training is completed, the retimer enters a low-delay mode.

12. The method according to claim 10, further comprising:
    storing, by the retimer, the equalization parameter in a register during the first link training; and
    after the first link training is completed, storing, by the retimer, the equalization parameter that is stored in the register in the first storage area.

13. The method according to claim 12, wherein the invoking, by the retimer, of the equalization parameter comprises:
    storing, by the retimer, the equalization parameter that is stored in the first storage area in the register.

14. The method according to claim 10, further comprising:
    after the first link training is completed, sending, by a basic input/output system (BIOS), the reset indication to the retimer; or,
    after the first link training is completed, sending, by the primary chip, the reset indication to the retimer.

15. A retimer, comprising:
    a plurality of data processing circuits;
    a control circuit, wherein a primary chip, a second chip, and the retimer participate in first link training, and, after the first link training is completed, the control circuit is configured to:
    store, in a first storage area, an equalization parameter corresponding to each rate during the first link training, and data stored in the first storage area is not lost after the retimer performs a reset operation;

during second link training, after the reset operation is performed, invoke the equalization parameter and bypass a plurality of data processing circuits in the retimer and transparently transmit a training sequence during the second link training, wherein the second link training is triggered by the reset operation;

after the second link training is completed, transparently transmit service data between the primary chip and the secondary chip based on the equalization parameter.

16. The retimer according to claim 15, wherein after the first link training is completed, the retimer is configured to enter a low-delay mode.

17. The retimer according to claim 15, wherein the first storage area is a storage area in a nonvolatile memory or firmware of the retimer.

18. The retimer according to claim 16, wherein the retimer further comprising:

a link state machine, and each data processing circuit of the plurality of data processing circuits is configured to convert the training sequence processed by the link state machine into serial data.

19. The retimer according to claim 15, wherein during the first link training, the control circuit is further configured to:

store the equalization parameter in a register; and, after the first link training is completed store, in the first storage area, the equalization parameter that is stored in the register.

20. The retimer according to claim 19, wherein, during the second link training, the control circuit is further configured to store the equalization parameter that is stored in the first storage area in the register.

* * * * *